United States Patent [19]
Eslambolchi et al.

[11] Patent Number: 6,148,123
[45] Date of Patent: Nov. 14, 2000

[54] METHOD AND APPARATUS FOR MEASURING OPTICAL DISTANCES

[75] Inventors: Hossein Eslambolchi, Basking Ridge, N.J.; John Sinclair Huffman, Conyers, Ga.

[73] Assignee: AT&T Corp, New York, N.Y.

[21] Appl. No.: 09/271,305

[22] Filed: Mar. 17, 1999

[51] Int. Cl.$^7$ ........................................... G02B 6/00
[52] U.S. Cl. ..................... 385/13; 250/227.15; 356/5.11
[58] Field of Search ........................ 385/12, 13; 356/5.01, 356/5.02, 5.03, 5.07, 5.08, 5.09, 5.1, 32–35, 5.11; 250/227.15, 227.16, 227.17; 73/800; 359/153, 155, 161

[56] References Cited

U.S. PATENT DOCUMENTS

| | | | |
|---|---|---|---|
| 4,904,050 | 2/1990 | Dunn et al. | 350/96.29 |
| 5,661,246 | 8/1997 | Wanser et al. | 73/800 |
| 5,778,114 | 7/1998 | Eslambolchi et al. | 385/12 |

OTHER PUBLICATIONS

Eric Udd, Fiber Sensors Based on the Sagnac Interferometer Passive Ring Resonator, pp. 233–269, Fiber Optic Sensors: An Introduction for Engineers and Scientists, Edited by Eric Udd. ISBN 0–471–83007–0, 1991 John Wiley & Sons, Inc.
The Photonics Dictonary, Book 4, 41st International Edition 1995, Absolute Optical Testing: Computers, Interferometers Combine for More Acurate Optical Tests, James C. Wyant; Fringes, Waves, Optical Quality: Understanding Where Fringes Come from and Their Roles in Quality, Bruce H. Walker (Walker Associates).

A. Yu, A.S. Siddiqui, Optical Modulators Using Fibreoptic Sagnac Interferometers, Paper 9806J (E13), first received Oct. 14, 1992 and in revised form Mar. 2, 1993. IEE Proc.–Optoelectron., vol. 141, No. 1, Feb. 1994, pp. 1–7.
Mieczyslaw Szustakowski, Leszek R. Jaroszewica, Detection of the phase disturbance in fibre optic Sagnac interferometer; SPIE vol. 2341 Interferometric Fiber Sensing (1994), pp. 74–88.
GRI–FOIDS Report, Appendix B, Submitted by Mason & Hanger National, Inc., 260 Finney Drive, Huntsville, AL 35824, Aug. 1995, Approved: NICOR Technologies Inc., pp. 1–23.
GRI–FOIDS Test Plan, Appendix 1, Submitted By: Mason & Hanger National, Inc., 260 Finney Drive, Huntsville, AL 35824, May 1995.
Field Evaluation of a Fiber Optic Intrusion Detection System—FOIDS, Prepared by: NICOR Technologies, Inc. no date available.

*Primary Examiner*—Hemang Sanghavi
*Attorney, Agent, or Firm*—Robert B. Levy

[57] ABSTRACT

The optical distance along a buried optical fiber (12) from a particular location (13) therealong to a central facility (10) is measured by first applying an intentional stress to the fiber in the form of a vibration signal (35) transmitted into the ground. A timing signal (36) is transmitted to the central facility (10) in synchronism with the application of the stress. Using the timing signal as a reference, the central facility can determine the time difference between when the stress was applied, and when the central facility detected the stress. From the time difference, and a knowledge of the propagation rate of the timing signal, the central facility can establish the optical distance to the particular location at which the stress was applied.

18 Claims, 1 Drawing Sheet

METHOD AND APPARATUS FOR MEASURING OPTICAL DISTANCES

TECHNICAL FIELD

This invention relates to a technique measuring the distance of a threat along a fiber from a central facility.

BACKGROUND ART

Most telecommunications carriers employ optical fibers in place of copper wires to carry telecommunications traffic. As compared to copper wires, optical fibers offer several advantages. Optical fibers possess much greater bandwidth in contrast to copper wires. Thus, a single optical fiber can carry many more voice conversations than a copper wire pair. Additionally, optical fibers are immune to electrical interference. Cross talk between two adjacent optical fibers within an optical fiber cable is nonexistent, whereas crosstalk between adjacent copper wires with the same cable can and does occur, resulting in signal deterioration.

For cosmetic reasons, as well as to provide protection against the elements, telecommunications carriers typically bury underground the optical fiber cables employed to carry long haul traffic. Unfortunately, burial does not render such optical fiber cables completely invulnerable to damage. Occasionally, a contractor excavating along an optical fiber cable right-of-way will inadvertently sever the cable. Since most fiber optic cables carry large volumes of telecommunications traffic, a severed optical fiber cable creates a major service disruption. For that reason, telecommunications carriers take great care to monitor their fiber optic cables to detect potential harm in an effort to avoid cable damage.

Various techniques exist for monitoring buried fiber optic cables. Once such technique is disclosed in U.S. Pat. No. 4,904,050, issued on Feb. 27, 1990, in the names of Lawrence Dunn et al. (herein incorporated by reference). The Dunn et al. '050 patent discloses the desirability of detecting intrusion on an optical fiber by an interferometric arrangement, whereby a pair of optical signal sub-signals, derived by splitting a single optical signal, are injected into opposite ends of the fiber via a coupler. In this way, each optical sub-signal injected into a fiber end emanates from the opposite fiber end. The optical sub-signals emanating from the fiber ends are recombined at the splitter for input to a detector that measures the phase difference between the signals as a detectable pattern. If an intrusion has occurred, the pattern detected by the detector will differ from the pattern detected under quiescent conditions (no intrusion).

U.S. Pat. No. 5,778,114, issued on Jul. 7, 1998, in the names of Hossein Eslambolchi and John Huffman, and assigned to AT&T, (incorporated by reference herein) describes and claims an fiber intrusion detection system that includes an optical splitter for splitting an optical signal into sub-signals for injection into opposite ends of fiber. The signals emanating from the opposite fiber ends are recombined at the splitter for receipt at a detector that measures the phase difference between the optical sub-signals. A processor compares the phase difference measured by the detector to phase difference measurements associated with different types of threats. By matching the actual phase difference to the phase difference measurement associated with a particular type of intrusion, the processor can thus identify the nature of the intrusion.

Neither the Dunn et al. '050 patent, nor the Eslambolchi et al. '114 patent provide any mechanism for determining the optical distance of the intrusion along the fiber from a central facility. Traditionally, the optical distance of an intrusion along the fiber is measured by the use of an Optical Time Domain Reflectometer (OTDR) that injects an optical signal into one end of a fiber in the cable for propagation therealong. The signal injected into the fiber will reflect back from a fault, such as a break in the fiber. By measuring the difference between transmission of the forward signal, and receipt of the reflected signal, of reflection, the OTDR can determine the optical distance to the fault. The optical distance to the fault often does not correspond to the sheath (route) distance along the cable because the cable typically contains loops at different splice points, thus making the optical distance longer. For that reason, a technician must rely on a cable installation drawing to correlate the measured optical fault distance to the sheath distance. Often, cable installation drawings may not accurately reflect loop lengths, thus yielding an inaccurate measure of the optical fault distance.

Thus, there is a need for a technique for obtaining a more accurate optical fault distance

BRIEF SUMMARY OF THE INVENTION

Briefly, the present invention provides a technique for measuring the optical distance along a fiber between an intentional intrusion and a central facility. In accordance with the invention, the optical distance is measured by subjecting the fiber to an intentional intrusion in the form of a known vibration signal. At the same time, a timing signal of known periodicity is transmitted in synchronism with the intrusion signal to the central facility. The central facility detects the intentional intrusion, typically by sensing the difference in phase between two optical sub-signals injected into opposite ends of the fiber. Using the timing signal transmitted in synchronism with the application of the stress, the central facility can determine the time difference between application of the intrusion, and its detection. From a knowledge of the signal propagation rate along the fiber, the central facility can readily determine the optical distance along the fiber between the point at which the stress is applied and the central facility and can communicate this information to a technician in the field, facilitating more rapid and more accurate detection of faults.

DETAILED DESCRIPTION

Figure 1:
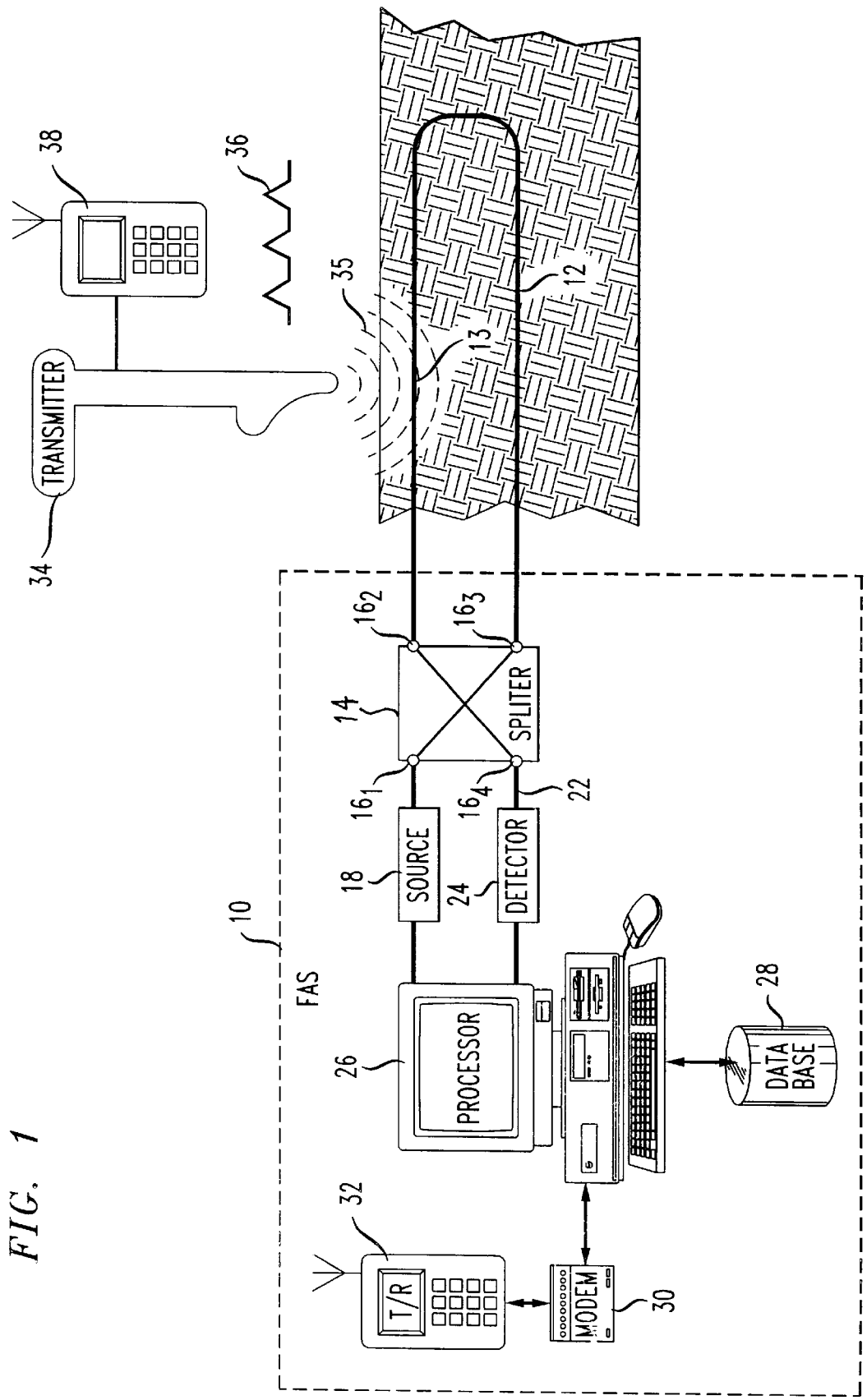
FIG. 1 shows an apparatus, in accordance with the invention, determining the optical distance along a buried optical fiber.

FIG. 1 depicts a Fiber Analysis System (FAS) 10 of the type disclosed U.S. Pat. No. 5,778,114 (incorporated by reference herein) for determining, in accordance with the method of the invention, the optical distance along a buried optical fiber 12 between the FAS 10 and a location 13 at which the fiber is intentionally stressed. While the fiber 12, which typically comprises part of a cable, is shown as a single integral member, the optical fiber could comprise a plurality of fiber pieces joined by one or more connectors (not shown). The FAS 10 includes a splitter 14 having four ports $16_1$–$16_4$. Gould, Inc. among others manufactures such four-port splitters. A source of light 18 having a high degree of coherence, such as a laser, produces a relatively narrow beam of light 20 for receipt at the splitter port $16_1$. Upon receipt of the beam 20 at its port $16_1$, the splitter 14 splits the beam, yielding two optical sub-signals at the splitter ports $16_2$ and $16_3$. The sub-signals are injected into to opposite ends of the fiber 12 and traverse the fiber in opposite directions. Each optical sub-signal exits the fiber 12 from the end opposite the end into which the sub-signal was injected.

The optical sub-signals exiting the fiber 12 ends re-enter the splitter ports $16_2$ and $16_3$, respectively, for re-combination by the splitter 14 into a single beam 22 that exits the splitter port $16_4$ for receipt at a detector 24. The detector 24 detects characteristics of the beam, and particularly, the interference between the two optical sub-signals recombined at the splitter 14. If the two optical sub-signals destructively interfere, then power of the beam detected by the detector 24 is low, whereas if the optical sub-signals constructively interfere, the power produced by the beam is high.

Under quiescent conditions, that is, with no stresses on the fiber 12, the optical sub-signals traveling in opposite directions in the fiber are 180° out-of-phase and cancel each other. However, when the fiber is stressed because of vibration, the sub-signals are not completely out of phase and do not cancel each other. Thus, the output signal of the detector 24 will change in response to stress on the fiber. Varying the split provided by the splitter 14 may control the magnitude of the detected phase difference. A 50—50 split provides the greatest sensitivity. However, other percentages may be desired where noise is a factor.

As taught in the aforementioned '114 patent, the particular stresses on the fiber are characterized by a processor 26 in the form of a computer or the like which controls the light source 18 to generate a continuous beam, a random pattern of light, or a pulsed beam representative of a string of binary values representing a digital word. The processor 26 is responsive to the output signal of the detector 24 and serves to compare the re-combined beam characteristics detected by the detector to plurality of reference values stored in a data base 28, typically comprised of a magnetic storage medium, such as a disk drive. For purposes of illustration, the database 28 has been depicted in FIG. 1 as an element distinct from the processor 26. In reality, the database 28 may reside on a disk drive within the processor itself. Alternatively, the data base 28 could reside on a file server (not shown) connected to the processor.

The processor 26 communicates through a modem 30, which although depicted as an external element, could be situated physically within the processor. The modem 30 is of a well-known design for interconnection with a transceiver (T/R) 32, which typically, although not necessarily comprises a wireless telephone, served by a wireless communications carrier, such as AT&T Wireless Communications.

In accordance with the invention, a technician seeking to establish the optical distance along the fiber 12 from the FAS 10 does so by intentionally applying a stress to the fiber via a transmitter 34 that transmits a signal 35 of 200 Hz–10,000 Hz into the ground to stress the fiber. In practice, the transmitter 34 may comprise part of a conventional cable-locating device, as are well known in the art. The signal 35 transmitted by the transmitter stresses the fiber 12, causing the FAS 10 to detect an intrusion to the fiber in the manner discussed above.

To establish the optical distance to the FAS 10 from the location 13 of the intrusion, the technician transmits to the FAS 10 a periodic timing signal 36 via a transceiver 38, typically a wireless telephone that communicates with the wireless transceiver 32 coupled through the modem 30 to the processor 26. The timing signal 36 has a periodicity known, or at least communicated to the processor 26 of the FAS 10 so that the processor knows the time intervals between the peaks of the timing signal. The transmitter 38 enjoys a connection to the transmitter 34 to enable the transmitter 38 to generate the timing signal 36 in synchronism with the intrusion signal 35. In this way, the processor 26 of the FAS 10 can utilize the timing signal to determine the time difference between application of the intrusion signal 35 and detection of the intrusion on the fiber 12. The rate at which the timing signal 36 propagates is known, or alternatively, can be easily measured to determine any delays associated with transmission of the timing from the transceiver 38 and its receipt by the transceiver 32.

By measuring the time difference between application of the intrusion signal 35 and detection of the intrusion, and by knowing the propagation rate of the timing signal 36, the processor 26 can determine the optical distance from the FAS 10 to the intrusion location 13 from the product of the propagation rate and the time difference. After calculating the optical distance, the processor 26 typically communicates the information to the technician at the intrusion location 13 via the wireless transceiver 38.

The above-described method of establishing the optical distance from FAS 10 to the intrusion location 13 eliminates the need for a technician to possess a cable installation drawing. Moreover, the method of the invention allows for more rapid fault detection. As discussed above, the optical distance from a fault, such as a break in the fiber 12, and central facility, such as the location of the FAS 10, is readily measurable using an Optical Time Domain Reflectometer (not shown). However, since the fiber 12 may include various buried loops, a technician can not readily correlate the optical distance to a sheath (route) distance. However, using the method of the invention, a technician can readily establish the optical distance between the intrusion location 13 and the central facility (FAS 10). From knowledge of the optical distance between to the central facility and the intrusion location 13, and from the measurement of the optical distance from the central facility to the fault location as provided by an OTDR, the technician can readily determine the distance between the intrusion location and the fault location, and undertake the necessary repairs.

In addition, the intrusion detection technique of the aforementioned '114 patent, as well as the optical distance measurement technique of the invention, collectively afford the advantage of obviating the need to apply any type of cable locating tone to the sheath of the cable 12. While applying such a tone enables efficient cable location by electromagnetic techniques, the presence of the tone does cause electrolysis, and sheath degradation. The optical distance measurement technique of the invention requires no such locating tone.

The above-described embodiments merely illustrate the principles of the invention. Those skilled in the art may make various modifications and changes that will embody the principles of the invention and fall within the spirit and scope thereof.

What is claimed is:

1. A method for determining the optical distance along a buried optical fiber from a particular location to a central facility, comprising the steps of:

intentionally applying a stress to the fiber at said particular location;

transmitting to the central facility a timing signal of known periodicity in synchronism with the application of the intentional stress;

detecting at the central facility the stress on the fiber;

establishing, from the timing signal a time difference between application of the stress and its detection at the central facility; and determining the optical distance from the particular location to the central facility in accordance with the time difference.

2. The method according to claim 1 wherein the fiber is intentionally stressed by applying a vibration thereto.

3. The method according to claim 2 wherein the vibration is applied to the fiber by transmitting a signal of within a prescribed frequency range into the ground.

4. The method according to claim 3 wherein the prescribed frequency range is 200 Hz to 10,000 HZ.

5. The method according to claim 1 wherein the step of detecting the intentionally applied stress comprises the steps of:

splitting an optical beam into a pair of sub-signals;

injecting the sub-signals into opposite ends of the fiber so that each sub-signal exits the fiber from an end opposite to which the sub-signal was injected;

recombining the sub-signals into a single beam; and measuring beam power to determine a phase difference between the sub-signals which varies in accordance with the stress applied to the fiber.

6. The method according to claim 1 wherein the periodic timing signal is transmitted to the central facility via a wireless transceiver.

7. The method according to claim 1 including the step of transmitting to the particular location an indication of the optical distance between the particular location and the central facility.

8. A method for determining the location of a fault on a buried optical fiber, comprising the steps of:

establishing an optical measure of the distance of the fault from a central facility;

intentionally applying a stress to the fiber at a particular location;

transmitting to the central facility a timing signal of known periodicity in synchronism with the application of the intentional stress;

detecting at the central facility the stress on the fiber;

establishing, from the timing signal a time difference between application of the stress and its detection at the central facility;

determining the optical distance from the particular location to the central facility in accordance with the time difference; and establishing the location of the fault in accordance with the difference between the distance of the fault and the central location and the distance from the particular location and the central facility.

9. The method according to claim 8 wherein the fiber is intentionally stressed by applying a vibration thereto.

10. The method according to claim 9 wherein the vibration is applied to the fiber by transmitting a signal of within a prescribed frequency range into the ground.

11. The method according to claim 10 wherein the prescribed frequency range is 200 Hz to 10,000 HZ.

12. The method according to claim 8 wherein the step of detecting the intentionally applied stress comprises the steps of:

splitting an optical beam into a pair of sub-signals;

injecting the sub-signals into opposite ends of the fiber so that each sub-signal exits the fiber from an end opposite to which the sub-signal was injected;

recombining the sub-signals into a single beam; and measuring beam power to determine a phase difference between the sub-signals which varies in accordance with the stress applied to the fiber.

13. The method according to claim 8 wherein the periodic timing signal is transmitted to the central facility via a wireless transceiver.

14. The method according to claim 8 including the step of transmitting to the particular location an indication of the optical distance between the particular location and the central facility.

15. Apparatus for determining the optical distance along a buried optical fiber from a particular location to a central facility, comprising the steps of:

means intentionally applying a stress to the fiber at said particular location;

means for transmitting to the central facility a timing signal of known periodicity in synchronism with the application of the intentional stress;

detecting means at the central facility the stress on the fiber; and processing means for establishing from the timing signal a time difference between application of the stress and its detection at the central facility and for determining the optical distance from the particular location to the central facility in accordance with the time difference.

16. The apparatus according to claim 15 wherein the detecting means comprises:

a source of coherent light;

a splitter for splitting an optical beam into a pair of sub-signals for injection into opposite ends of the fiber so that each sub-signal exits the fiber from an end opposite to which the sub-signal was injected and for recombining the sub-signals into a single beam; and means for measuring beam power to determine a phase difference between the sub-signals which varies in accordance with the stress applied to the fiber.

17. The apparatus according to claim 15 wherein the means for intentionally stressing the fiber comprises a signal generator for transmitting a vibration signal into the ground.

18. The apparatus according to claim 15 wherein the means for transmitting the timing signal includes a wireless transceiver.

* * * * *